US006832064B2

(12) United States Patent
Simpson et al.

(10) Patent No.: US 6,832,064 B2
(45) Date of Patent: Dec. 14, 2004

(54) SEAMLESS DRYING BELT FOR ELECTROPHOTOGRAPHIC PROCESS

(75) Inventors: Charles W. Simpson, Lakeland, MN (US); Leonard J. Stulc, Shafer, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 74 days.

(21) Appl. No.: 10/013,635

(22) Filed: Dec. 10, 2001

(65) Prior Publication Data

US 2002/0122948 A1 Sep. 5, 2002

Related U.S. Application Data

(60) Provisional application No. 60/258,783, filed on Dec. 29, 2000.

(51) Int. Cl.[7] ........................ G03G 15/11; B32B 31/26; B32B 27/00; B32B 9/04

(52) U.S. Cl. ....................... 399/249; 428/421; 428/447; 427/385.5; 427/387

(58) Field of Search ................................ 428/421, 446, 428/447, 448; 427/385.5, 387; 399/249

(56) References Cited

U.S. PATENT DOCUMENTS

| | | | | |
|---|---|---|---|---|
| 4,033,768 A | | 7/1977 | Wieloch | 96/1.5 |
| 5,021,109 A | | 6/1991 | Petropoulos et al. | 156/137 |
| 5,736,286 A | | 4/1998 | Kaneko et al. | 430/97 |
| 6,037,092 A | * | 3/2000 | Heeks et al. | 430/124 |
| 6,083,676 A | * | 7/2000 | Chen et al. | 430/523 |
| 6,356,728 B1 | * | 3/2002 | Watanabe | 399/250 |

* cited by examiner

*Primary Examiner*—Philip Tucker
*Assistant Examiner*—Michael J Feely
(74) *Attorney, Agent, or Firm*—Mark A. Litman & Associates, P.A.

(57) ABSTRACT

A drying belt for electrophotographic imaging process comprising:

(a) a seamless substrate; and (b) an absorbent layer on the seamless substrate wherein the absorbent layer comprising an absorbing material for carrier liquid of an electrophotographic toner.

15 Claims, 2 Drawing Sheets

SEAMLESS DRYING BELT FOR ELECTROPHOTOGRAPHIC PROCESS

This application claim the benefit of Provisional Application No. 60/258,783 filed Dec. 29, 2000.

BACKGROUND OF THE INVENTION

1. Field Of Invention

This invention relates to an endless seamless drying belt suitable for use in electrophotography and, more specifically, to an endless seamless drying belt comprising or coated with an absorbing material that has a high affinity to carrier fluids used in liquid inks for electrophotography.

2. Background

In electrophotography, an organophotoreceptor in the form of a plate, belt, or drum having an electrically insulating photoconductive element on an electrically conductive substrate is imaged by first uniformly electrostatically charging the surface of the photoconductive element, and then exposing the charged surface to a pattern of light. The light exposure selectively dissipates the charge in the illuminated areas, thereby forming a pattern of charged and uncharged areas. A liquid or solid powder ink is then deposited in either the charged or uncharged areas to create a toned image on the surface of the photoconductive element. The resulting visible ink image can be fixed to the photoreceptor surface or transferred to a surface of a suitable receiving medium such as sheets of material, including, for example, paper, metal, metal coated substrates, composites and the like. The imaging process can be repeated many times on the reusable photoconductive element.

The photoconductive element usually comprises a charge generating layer, a charge transport layer, and optionally other layers such as a barrier layer, a release layer, an adhesive layer, and a sub-layer. The purpose of the charge generating material is to assist in the generation of charge carriers (i.e., holes or electrons) upon exposure to light. The purpose of the charge transport material is to assist in accepting these charge carriers and transport them through the charge transport layer in order to discharge a surface charge on the photoconductive element.

In some electrophotographic imaging systems, the latent images are formed and developed on top of one another in a common imaging region of the organophotoreceptor. The latent images can be formed and developed in multiple passes of the photoconductor around a continuous transport path (i.e., a multi-pass system). Alternatively, the latent images can be formed and developed in a single pass of the photoconductor around the continuous transport path. A single-pass system enables the multi-color images to be assembled at extremely high speeds relative to the multi-pass pass system. At each color development station, liquid color developers are applied to the photoconductor belt, for example by electrically biased rotating developer rolls. The colored liquid developer (or ink) is made of small colored pigment particles dispersed in an insulating liquid (i.e., a carrier liquid).

Excess carrier liquid deposited on the photoconductor belt may stain and smudge the image, and/or cause problems in transferring the image to the transfer roll or output substrate. As such, a liquid removal mechanism such as a squeegee roll may be used immediately after each developer roll to remove excess carrier liquid deposited on the photoconductor belt at each color station. However, before the developed image is transferred to an output substrate, further drying of the image is typically required to remove all (or most all of) any remaining carrier liquid.

U.S. Pat. No. 5,420,675 to Thompson et al. teaches a drying system that uses a film forming drying roll. The drying roll is in contact with the imaged side of the photoconductor belt. The film forming drying roll has a thin, outer layer that is carrier liquid-phillic and an inner layer that is carrier liquid-phobic and compliant. As the drying roller contacts the organophotoreceptor during the electrophotographic process, the carrier liquid entrains in the carrier liquid-philic layer and is later removed from it by heating the liquid to a temperature greater than the flash point of the carrier liquid.

U.S. Pat. No. 5,552,869 to Schilli et al. discloses a drying method and apparatus for electrophotography using liquid inks. The drying apparatus removes excess carrier liquid from an image produced by liquid electrophotography on a moving organophotoreceptor belt. The system includes a drying roll that contacts the organophotoreceptor, with an outer layer that absorbs and desorbs the carrier liquid and an inner layer having a Shore A hardness of 10 to 60 which is carrier liquid-phobic, and a heating means to increase the temperature of the drying roll to no more than 5° C. below the flash point of the carrier liquid. In one embodiment, the heating means includes two hot rolls and the system further includes a cooling means that cool the drying roll.

U.S. Pat. No. 5,736,286 to Kaneko et al. discloses the employment of a drying belt to remove carrier fluids in liquid inks. However, current techniques to manufacture drying belts have largely relied on belts where the two ends of the belt material have been lapped or overlapped to form the seam or have butted against one another to form a seam. The seam is then fastened by heat or other means of adhesion such as by the use of an adhesive or welding techniques, such as ultrasonic welding or laser welding. The resulted seamed belt causes undesirable seamed marks on prints.

SUMMARY OF THE INVENTION

This invention features a seamless drying belt having a seamless belt substrate and an absorbing material that removes carrier fluid from the plated images on the organophotoreceptor belt before transferred to the transfer roll. The seamless drying belt does not cause any seam mark on prints.

In a first aspect, the invention features a seamless drying belt that includes:

(a) a seamless substrate; and (b) an absorbent layer on the seamless substrate wherein the absorbent layer comprising an absorbing material for carrier liquid of an electrophotographic toner.

In a second aspect, the invention features a process of preparing a seamless drying belt for electrophotographic imaging process that includes the steps of:

(a) mounting a seamless substrate on a belt mount;

(b) applying an absorbent layer comprising an absorbing material for carrier liquid of an electrophotographic toner on the seamless substrate; and (c) curing the absorbent layer by heat.

In the description of the process, steps are separated by alphanumeric headings for convenience, not necessarily for identifying a sequence. The same is true for the applying of the various voltages. The numbering of the voltages is for identification purpose. The voltages can be applied in any order as long as they are done before the imagewise exposing step. As is apparent to one skilled in the art, the sequence of steps may be reversed, such as the order in which the individual dispersions are prepared, and the like. Unless a sequence of steps is identified as being in sequence, no sequence is required, except for those necessarily in sequence, as where a dispersion is coated, and the solids should have been dispersed before coating.

Other features and advantages of the invention will be apparent from the following description of the preferred embodiments thereof, and from the claims.

DETAILED DESCRIPTION OF THE INVENTION

Liquid electrophotography is a technology which produces or reproduces an image on paper or other desired receiving material. Liquid electrophotography uses liquid inks which may be black or which may be of different colors for the purpose of plating solid colored material onto a surface in a well-controlled and image-wise manner to create the desired prints. In some cases, liquid inks used in electrophotography are substantially transparent or translucent to radiation emitted at the wavelength of the latent image generation device so that multiple image planes can be laid over one another to produce a multi-colored image constructed of a plurality of image planes with each image plane being constructed with a liquid ink of a particular color. Typically, a colored image is constructed of four image planes. The first three planes are constructed with a liquid ink in each of the three subtractive primary printing colors, yellow, cyan and magenta. The fourth image plane uses black ink, which need not be transparent to radiation emitted at the wavelength of the latent image generation device.

Figure 1:
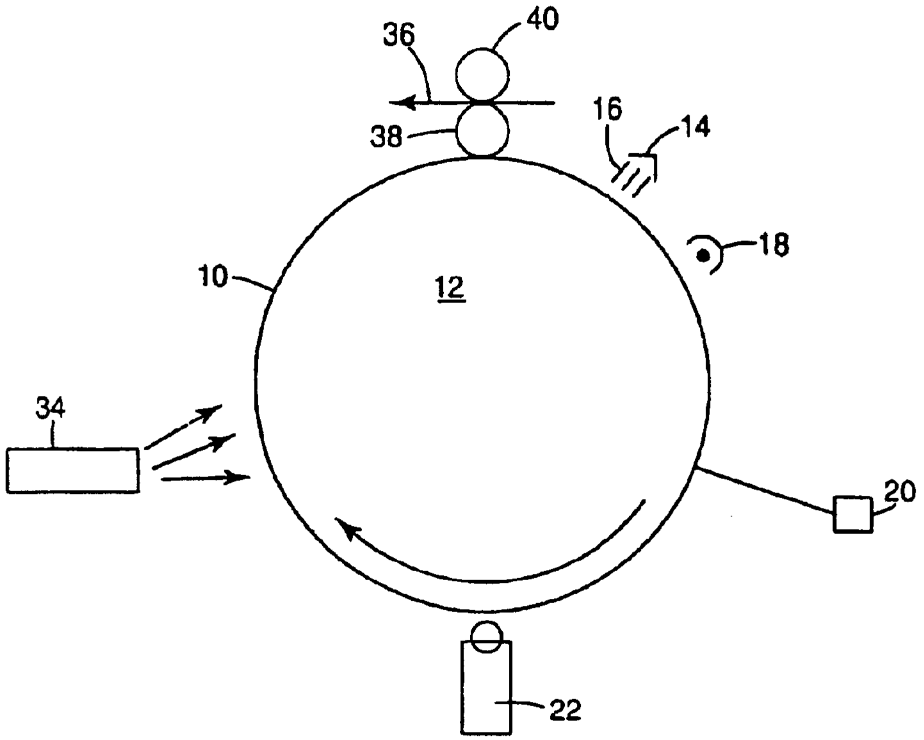
FIGS. 1 and 2 are diagrammatic illustrations of a basic liquid electrophotographic process in which the present invention has utility and an apparatus for performing that process.

The typical process involved in liquid electrophotography can be illustrated with respect to a single color by reference to FIG. 1. Light sensitive, organophotoreceptor 10 is arranged on or near the surface of a mechanical carrier such as drum 12. Organophotoreceptor 10 can be in the form of a belt or loop mounting on the outer surface of the drum. The mechanical carrier could, of course, be a belt or other movable support object. Drum 12 rotates in the clockwise direction of FIG. 1 moving a given location of organophotoreceptor 10 past various stationary components which perform an operation relative to organophotoreceptor 10 or an image formed on drum 12.

Of course, other mechanical arrangements could be used which provide relative movement between a given location on the surface of organophotoreceptor 10 and various components which operate on or in relation to organophotoreceptor 10. For example, organophotoreceptor 10 could be stationary while the various components move past organophotoreceptor 10 or some combination of movement between both organophotoreceptor 10 and the various components could be facilitated. It is only important that there be relative movement between organophotoreceptor 10 and the other components. As this description refers to organophotoreceptor 10 being in a certain position or passing a certain position, it is to be recognized and understood that what is being referred to is a particular spot or location on organophotoreceptor 10 which has a certain position or passes a certain position relative to the components operating on organophotoreceptor 10.

In FIG. 1, as drum 12 rotates, organophotoreceptor 10 moves past erase lamp 14. When organophotoreceptor 10 passes under erase lamp 14, radiation 16 from erase lamp 14 impinges on the surface of organophotoreceptor 10 causing any residual charge remaining on the surface of organophotoreceptor 10 to "bleed" away. Thus, the surface charge distribution of the surface of organophotoreceptor 10 as it exits erase lamp 14 is quite uniform and nearly zero depending upon the organophotoreceptor.

As drum 12 continues to rotate and organophotoreceptor 10 next passes under charging device 18, such as a roll corona, a uniform positive or negative charge is imposed upon the surface of organophotoreceptor 10. In a preferred embodiment, the charging device 18 is a positive DC corona and the surface of organophotoreceptor 10 is uniformly charged to around 400–1000 volts (e.g., 600 volts) depending on the capacitance of organophotoreceptor, while the electrically conductive substrate of the organophotoreceptor is grounded or controlled at a less positive or even negative voltage. In another preferred embodiment, the charging device 18 is a negative DC corona and the surface of organophotoreceptor 10 is uniformly charged to around −400 to −1000 volts (e.g., −600 volts) depending on the capacitance of the organophotoreceptor, while the electrically conductive substrate of the organophotoreceptor is grounded or controlled at a less negative or even positive voltage. This prepares the surface of organophotoreceptor 10 for an image-wise exposure to radiation by laser scanning device 20 as drum 12 continues to rotate. Wherever radiation from laser scanning device 20 impinges on the surface of organophotoreceptor 10, the surface charge of organophotoreceptor 10 is reduced significantly while areas on the surface of organophotoreceptor 10 which do not receive radiation are not appreciably discharged. Areas of the surface of organophotoreceptor 10 which receive some radiation are discharged to a degree that corresponds to the amount of radiation received. This results in the surface of organophotoreceptor 10 having a surface charge distribution which is proportional to the desired image information imparted by laser scanning device 20 when the surface of organophotoreceptor 10 exits from under laser scanning device 20.

As drum 12 continues to rotate, the surface of organophotoreceptor 10 passes by liquid ink developer station 22. The operation of liquid ink developer station 22 can be more readily understood by reference to FIG. 2. Liquid ink 24 is applied to the surface of image-wise charged organophotoreceptor 10 in the presence of a positive or negative electric field which is established by placing developer roll 26 near the surface of organophotoreceptor 10 and imposing a bias voltage on developer roll 26. Liquid ink 24 consists of positively or negatively charged "solid", but not necessarily opaque, ink particles of the desired color for this portion of the image being printed. The "solid" powder material in the ink, under force from the established electric field, migrates to and plates upon the surface of organophotoreceptor 10 in areas 28 where the surface voltage is less than the bias voltage of developer roll 26. The "solid" material in the ink will migrate to and plate upon the developer roll in areas 30 where surface voltage of organophotoreceptor 10 is greater than the bias voltage of developer roll 26. Excess liquid ink not sufficiently plated to either the surface of organophotoreceptor 10 or to developer roll 26 is removed.

The ink is further dried by drying mechanism 32, which may include a roll, vacuum box, heating source, or curing station. Drying mechanism 32 substantially transforms liquid ink 24 into a substantially dry ink film. The excess liquid ink 24 then returns to liquid ink developer station 22 for use in a subsequent operation. The "solid" portion 28 (ink film) of liquid ink 24 plated upon the surface of organophotoreceptor 10 matches the previous image-wise charge distribution previously place upon the surface of organophotoreceptor 10 by laser scanning device 20 and, hence, is an image-wise representation of the desired image to be printed.

Referring again to FIG. 1, ink film 28 from liquid ink 24 is further dried by drying mechanism 34. Drying mechanism 34 may be passive, may utilize active air blowers, or may be other active devices such as rollers or belts coated with absorbing materials. In a preferred embodiment, drying mechanism 34 is a seamless drying belt comprising a seamless belt substrate coated with an absorbent layer having an absorbing material.

The seamless belt substrate may be opaque or substantially transparent and may comprise any suitable components giving the desired properties. Non-limiting examples of suitable materials for the seamless belt substrate are polyester such as polyethylene terephthalate and polyethylene naphthalate, polyimide, polysulfone, polyamide, polycarbonate, vinyl resins such as polyvinyl fluoride and polystyrene, fabric or film coated with these polymers, and the like. Specific examples of supporting substrates included polyethersulfone (Stabar® S-100, commercially available from ICI), polyvinyl fluoride (Tedlar®, commercially available from E.I. DuPont de Nemours & Company), polybisphenol-A polycarbonate (Makrofol®, commercially available from Mobay Chemical Company) and amorphous polyethylene terephthalate (Melinar®, commercially available from ICI Americas, Inc. and Dupont A and Dupont 442, commercially available from E.I. DuPont de Nemours & Company).

The desired thickness of the seamless belt substrate depends on a number of factors, including economic consideration. The substrate typically is between 10 microns and 1000 microns thick, preferably between 25 microns and 250 microns. When the belt is used in a liquid electrophotographic imaging member, the thickness of the seamless belt substrate should be selected to avoid any adverse affects on the final device. The seamless belt substrate should not be so thin that it splits and/or exhibits poor durability characteristics. The seamless belt substrate likewise should not be so thick that it may give rise to early failure during cycling, a lower flexibility, and a higher cost for unnecessary material.

Non-limiting examples of suitable seamless belt substrate for the drying belt are Monolyn MQ™ 21 tubing obtained from M&Q Packaging Corporation (Schuylkill Haven, Pa.) and Spiral Wound tube obtained from Electrolock, Inc. (Cleveland, Ohio).

The absorbing material in the absorbent layer should be mechanically durable and have a high affinity to the carrier fluids, e.g., hydrocarbons, in the liquid inks. Non-limiting examples of suitable absorbent material are fluorinated polymer, siloxane polymer or polysiloxane, silcone gum, fluorosilicone polymer, silane polymer, polyethylene, polypropylene, or a combination thereof. Preferably, the absorbing material comprises cross-linked silicone polymers. The absorbant materials may comprise a porous material of these compositions (e.g., porous film or porous fabric) that absorbs the carrier liquid through surface tension activity or a solid, non-porous material that absorbs the carrier liquid.

The absorbent layer should not be too thin that it has a limiting absorption capacity. The absorbent layer likewise should not be so thick that it may give rise to cracking, delamination from the seamless belt substrate, and higher cost for unnecessary material. In general, the thickness of the absorbent layer is greater than 25 microns, preferably in the range of 25 to 1000 microns, more preferably in the range of 25 to 250 microns.

Optional conventional additives, such as, for example, adhesion promoters, surfactants, fillers, coupling agents, silanes, photoinitiators, fibers, lubricants, wetting agents, pigments, dyes, plasticizers, release agents, suspending agents, cross-linking agents, catalysts, and curing agents, may be included in the absorbent layer, some of which may be intended to migrate to the ink layer, while others are intended to remain fixed on or in the absorbent layer.

The preferred absorbing materials are cross-linked silicone polymers. The cross-linking of the siloxanes can be undertaken by any of a variety of methods including free radical reactions, condensation reactions, hydrosilylation addition reactions, hydrosilane/silanol reactions, and photoinitiated reactions relying on the activation of an intermediate to induce subsequent cross-linking.

Preferably, the cross-liking agent is present in an amount of greater than about 0 to about 20, preferably about 5 to about 15, and more preferably about 8 to about 12, parts by weight.

Commercially available examples of a cross-linking agent include those commercially available under the trade designations SYL-OFF® 7048 and 7678 (from Dow Corning, Midland, Mich.), SYLGARD® 186 (from Dow Corning, Midland, Mich.), NM203, PS 122.5 and PS123 (from Huls America Inc.), DC7048 (Dow Corning Corp.), F-9W-9 (Shin Etsu Chemical Co. Ltd.) and VXL (O Si Specialties).

The above components are preferably reacted in the presence of a catalyst capable of catalyzing addition cross-linking of the above components to form a release coating composition. Suitable catalysts include the transition metal catalysts described for hydrosilylation in The Chemistry of Organic Silicone Compounds, Ojima, (S. Patai, J. Rappaport eds., John Wiley and Sons, New York 1989). Such catalysts may be either heat or radiation activated. Examples include, but are not limited to, alkene complexes of Pt(II), phosphine complexes of Pt(I) and Pt(O), and organic complexes of Rh(I). Choroplatinic acid based catalysts are the preferred catalysts. Inhibitors may be added as necessary or desired in order to extend the pot life and control the reaction rate. Commercially available hydrosilation catalysts based on chloroplatinic acid include those available under the trade designations: PC 075, PC 085 (Huls America Inc.), Syl-Off® 7127, Syl-Off® 7057, Syl-Off® 4000 (all from Dow Corning Corp.), SL 6010-D1 (General Electric), VCAT-RT, VCAT-ET (O Si Specialties), and PL-4 and PL-8 (Shin Etsu Chemical Co. Ltd.).

Other cross-linking reactions may also be used to form the cross-linked siloxane polymer with a bimodal distribution of chain lengths between cross-links. Cross-linking reactions that have been used include free radical reactions, condensation reactions, hydrosilylation addition reactions, and hydrosilane/silanol reactions. Cross-linking may also result from photoinitiated reactions relying on the activation of an intermediate to induce subsequent cross-linking.

Peroxide induced free radical reactions that rely on the availability of C—H bonds present in the methyl side groups provide a non-specific cross-link structure that would not result in the desired network structure. However, the use of siloxanes containing vinyl groups with vinyl specific peroxides could provide the desired structure given the appropriate choice of starting materials. Free radical reactions can also be activated by UV light or other sources of high energy radiation, e.g., electron beams.

The condensation reaction can occur between complementary groups attached to the siloxane backbone. Isocyanate, epoxy, or carboxylic acids condensing with amine or hydroxy functionalities have been used to cross-link siloxanes. More commonly, the condensation reaction relies on the ability of some organic groups attached to silicon to react with water, thus providing silanol groups which further react with either the starting material or other silanol group to produce a cross-link. It is known that many groups attached to silicon are readily hydrolyzable to produce silanol groups. In particular, alkoxy, acyloxy, and oxime groups are known to undergo this reaction. In the absence of moisture, these groups do not react, and therefore, provide a sufficient working life relative to unprotected silanol groups. On exposure to moisture, these groups spontaneously hydrolyze and condense. These systems may be catalyzed as necessary. A subset of these systems are tri- or tetra-functional silanes containing three or four hydrolyzable groups.

Hydrosilane groups can react in a similar manner as described for the condensation reaction. They can react directly with SiOH groups or may first be converted to an OH group by reaction with water before condensing with a second SiOH moiety. The reaction may be catalyzed by either condensation or hydrosilylation catalysts.

The hydrosilylation addition reaction relies on the ability of the hydrosilane bond to add across a carbon-carbon double bond in the presence of a noble metal catalyst. Such reactions are widely used in the synthesis of organofunctional siloxanes and to prepare release liners for pressure sensitive adhesives.

Well known photoinitiated reactions can be adapted to cross-link siloxanes. Organofunctional groups such as cinnamates, acrylates, epoxies, allyl, etc., can be attached to the siloxane backbone. Additionally, the photoinitiators may be grafted onto the siloxane backbone for improved solubility. Other examples of this chemistry include addition of a thiol across a carbon carbon double bond (typically, an aromatic ketone initiator is required), hydrosilane/ene addition (the free radical equivalent of the hydrosilylation reaction), acrylate polymerization (can also be electron beam activated), and radiation induced cationic polymerization of epoxides, vinyl ethers, and other functionalities.

The ink film 28 portion of liquid ink 24, representing the desired image to be printed, is then transferred, either directly to the receiving medium 36 to be printed, or preferably and as illustrated in FIG. 1, indirectly by way of transfer rollers 38 and 40. Transfer is effected by differential tack of ink film 28 and transfer rollers 38 and 40. Typically, heat and pressure are utilized to fuse the image to receiving medium 36. The resultant "print" is a hard copy manifestation of the image information written by laser scanning device 22 and is of a single color, the color represented by liquid ink 24.

Figure 2:
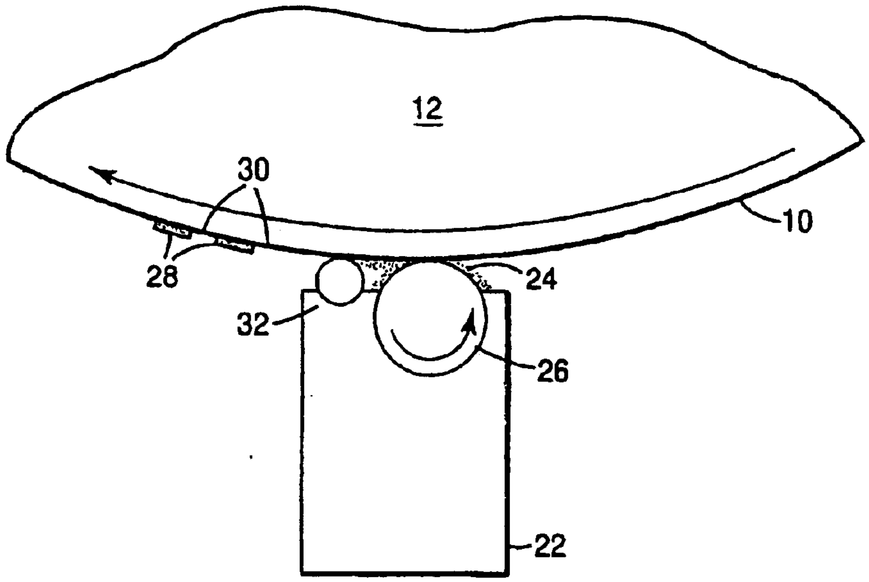

While organophotoreceptor 10, drum 12, erase lamp 14, charging device 18, laser scanning device 20, liquid ink developer station 22, liquid ink 24, developer roll 26, squeegee 32, drying mechanism 34 and transfer rollers 38 and 40 have been only diagrammatically illustrated in FIGS. 1 and 2 and only generally described with relation thereto, it is to be recognized and understood that these components are generally well known in the art of electrophotography and the exact material and construction of these elements is a matter of design choice which is also well understood in the art.

It is possible, of course, to make prints containing many colors rather than one single color. The basic liquid electrophotography process and apparatus described in FIGS. 1 and 2 can be used by repeating the process described above for one color, a number of times wherein each repetition may image-wise expose a separate primary color plane, e.g., cyan, magenta, yellow or black, and each liquid ink 24 may be of a separate primary printing color corresponding to the image-wise exposed color plane. Superposition of four such color planes may be achieved with good registration onto the surface of organophotoreceptor 10 without transferring any of the color planes until all have been formed. Subsequent simultaneous transfer of all of these four color planes to a suitable receiving medium 36 may yield a quality color print.

While the above described liquid electrophotography process is suitable for construction of a multi-colored image, the process is somewhat slow because organophotoreceptor 10 should repeat the entire sequence for each color of the typical four color colored image. When the above process is performed for a particular color, e.g., cyan, laser scanning device 20 causes areas 20 organophotoreceptor 10 receiving radiation to at least partially discharged to create a surface charge distribution pattern of the surface of organophotoreceptor 10 which represents the portion of the image to be reproduced representing that particular color, e.g., cyan. After development by liquid developer station 22, the surface charge distribution of organophotoreceptor 10 is still quite variable (assuming at least some pattern to the image to be reproduced) and too low to be subsequently imaged. Organophotoreceptor 10 then should be erased to make the surface charge distribution uniform and should be again charged to provide a sufficient surface charge to allow a subsequent development process to plate liquid ink upon areas 28 of organophotoreceptor 10.

Figure 3:
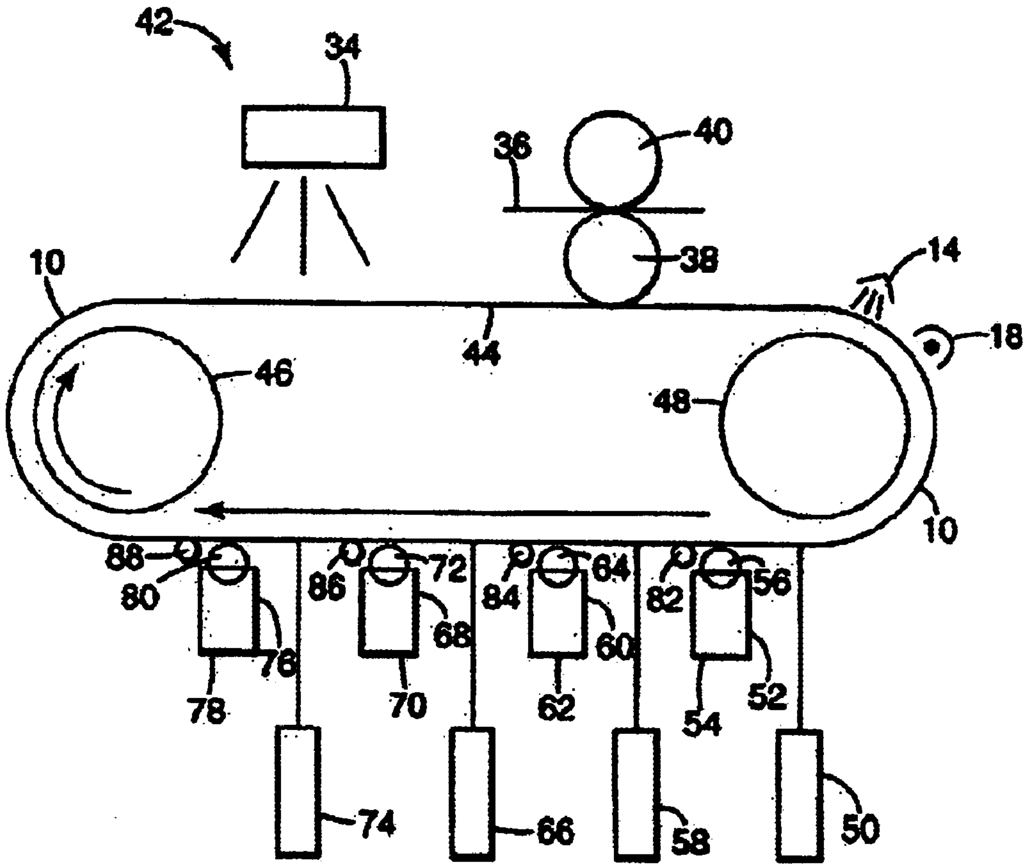
FIG. 3 is a diagrammatic illustration of an apparatus and a method for producing a multi-colored image in accordance with the present invention.

While not required by all embodiments of the present invention, FIG. 3 diagrammatically illustrates an apparatus 42 and a method for producing a multicolored image. Organophotoreceptor 10 is mechanically supported by belt 44, which rotates in a clockwise direction around rollers 46 and 48. Organophotoreceptor 10 is first conventionally erased with erase lamp 14. Any residual charge left on organophotoreceptor 10 after the preceding cycle is preferably removed by erase lamp 14 and then conventionally charged using charging device 18, such procedures being well known in the art. When so charged, the surface of organophotoreceptor 10 is uniformly charged to around positive (or negative) 600 volts, preferably. Laser scanning device 50, similar to laser scanning device 20 illustrated in FIG. 1, exposes the surface of organophotoreceptor 10 to radiation in an image-wise pattern corresponding to a first color plane of the image to be reproduced.

With the surface of organophotoreceptor so image-wise charged, charged pigment particles in liquid ink 54 corresponding to the first color plane will migrate to and plate upon the surface of organophotoreceptor 10 in areas where the surface voltage of organophotoreceptor 10 is less than the bias of developer roll 56 associated with liquid ink developer station 52. The charge neutrality of liquid ink 54 is maintained by negatively (or positively) charged counter ions, which balance the positively (or negatively) charged pigment particles. Counter ions are deposited on the surface of organophotoreceptor 10 in areas where the surface voltage is greater than the bias voltage of developer roll 56 associated with liquid ink developer station 52.

At this stage, organophotoreceptor 10 contains on its surface an image-wise distribution of plated "solids" of liquid ink 52 in accordance with a first color plane. The surface charge distribution of organophotoreceptor 10 has also been recharged with plated ink particles as well as with transparent counter ions from liquid ink 52 both being governed by the image-wise discharge of organophotoreceptor 10 due to laser scanning device 50. Thus, at this stage the surface charge of organophotoreceptor 10 is also quite uniform. Although not all of the original surface charge of organophotoreceptor may have been obtained, a substantial portion of the previous surface charge of organophotoreceptor has been recaptured. With such solution recharging, organophotoreceptor 10 is now ready to be processed for the next color plane of the image to be reproduced.

As belt 44 continues to rotate, organophotoreceptor 10 next is image-wise exposed to radiation from laser scanning device 58 corresponding to a second color plane. Note that this process occurs during a single revolution of organophotoreceptor 10 by belt 44 and without the necessity of organophotoreceptor 10 being subjected to erase subsequent to exposure to laser scanning device 50 and liquid ink development station 52 corresponding to a first color plane. The remaining charge on the surface of organophotoreceptor 10 is subjected to radiation corresponding to a second color plane. This produces an image-wise distribution of surface charge on organophotoreceptor 10 corresponding to the second color plane of the image.

The second color plane of the image is then developed by developer station 60 containing liquid ink 60. Although liquid ink 62 contains "solid" color pigments consistent with the second color plane, liquid ink 62 also contains substantially transparent counter ions which, although they may have differing chemical compositions than substantially transparent counter ions of liquid ink 54, still are substantially transparent and oppositely charged to the "solid" color pigments. Developer roll 64 provides a bias voltage to allow "solid" color pigments of liquid ink 62 create a pattern of "solid" color pigments on the surface of organophotoreceptor 10 corresponding to the second color plane. The transparent counter ions also substantially recharge organophotoreceptor 10 and make the surface charge distribution of organophotoreceptor 10 substantially uniform so that another color plane may be placed upon organophotoreceptor 10 without the necessity of erase nor corona charging.

A third color plane of the image to be reproduced is deposited on the surface of organophotoreceptor 10 is similar fashion using laser scanning device 66 and developer station 70 containing liquid ink 68 using developer roll 72. Again, the surface charge existing on organophotoreceptor 10 following development of the third color plane may be somewhat less than existed prior to exposure to laser scanning device 66 but will be substantially "recharged" and will be quite uniform allowing application of the fourth color plane without the necessity of erase or corona charging.

Similarly, a fourth color plane is deposited upon organophotoreceptor 10 using laser scanning device 74 and developer station 78 containing liquid ink 76 using developer roll 80.

Preferably, excess liquid from liquid inks 54, 62, 70 and 78 is "squeezed" off using a roller similar to roller 32 described with respect to FIG. 1. Such a roller may be used in conjunction with any of developer stations 52, 60, 68 or 76 or all of them.

The plated solids from liquid inks 52, 60, 68 and 76 are dried in a drying mechanism 34 similar to that described with respect to FIG. 1. Drying mechanism 34 may be passive, may utilize active air blowers or may be other active devices such as drying rollers, vacuum devices, coronas, etc.

The completed four color image is then transferred, either directly to the receiving medium 36 to be printed, or preferably and as illustrated in FIG. 3, indirectly by way of transfer rollers 38 and 40. Typically, heat and/or pressure are utilized to fix the image to receiving medium 36. The resultant "print" is a hard copy manifestation of the four color image.

With proper selection of charging voltages, organophotoreceptor capacity and liquid ink, this process may be repeated an indeterminate number of times to produce a multi-colored image having an indeterminate number of color planes. Although the process and apparatus has been described above for conventional four color images, the process and apparatus are suitable for multi-color images having two or more color planes.

One type of ink found particularly suitable for use as liquid inks 52, 60, 68 and 76 consists of ink materials that are substantially transparent and of low absorptivity to radiation from laser scanning devices 50, 58, 66 and 74. This allows radiation from laser scanning devices 50, 58, 66 and 74 to pass through the previously deposited ink or inks and impinge on the surface of organophotoreceptor 10 and reduce the deposited charge. This type of ink permits subsequent imaging to be effected through previously developed ink images as when forming a second, third, or fourth color plane without consideration for the order of color deposition. It is preferable that the inks transmit at least 80% and more preferably 90% of radiation from laser scanning devices 50, 58, 66 and 74 and that the radiation is not significantly scattered by the deposited ink material of liquid inks 52, 60, 68 and 76.

One type of ink found particularly suitable for use as liquid inks 52, 60, 68 and 76 are organosols which exhibit excellent imaging characteristics in liquid immersion development. For example, the organosol liquid inks exhibit low bulk conductivity, low free phase conductivity, low charge/mass and adequate mobility, all desirable characteristics for producing high resolution, background free images with high optical density. In particular, the low bulk conductivity, low free phase conductivity and low charge/mass of the inks allow them to achieve high developed optical density over a wide range of solids concentrations, thus improving their extended printing performance relative to conventional inks.

These color liquid inks on development form colored films which transmit incident radiation, consequently allowing the photoconductor layer to discharge, while non-coalescent particles scatter a portion of the incident light. Non-coalesced ink particles therefore result in the decreasing of the sensitivity of the photoconductor to subsequent exposures and consequently there is interference with the overprinted image.

These inks have low Tg values which enables the inks to form films at room temperature. Normal room temperature (19°–20° C.) is sufficient to enable film forming and of course the ambient internal temperatures of the apparatus during operation which tends to be at a higher temperature (e.g., 25°–40° C.) even without specific heating elements is sufficient to cause the ink or allow the ink to form a film.

Residual image tack after transfer may be adversely affected by the presence of high tack monomers, such as ethyl acrylate, in the organosol. Therefore, the organosols are generally formulated such that the organosol core preferably has a glass transition temperature (Tg) less than room temperature (25° C.) but greater than −10° C. This permits the inks to rapidly self-fix under normal room temperature or higher development conditions and also produce tack-free fixed images which resist blocking.

The carrier liquid may be selected from a wide variety of materials which are well known in the art. The carrier liquid is typically oleophilic, chemically stable under a variety of conditions, and electrically insulating. Electrically insulating means that the carrier liquid has a low dielectric constant and a high electrical resistivity. Preferably, the carrier liquid has a dielectric constant of less than 5, and still more preferably less than 3. Examples of suitable carrier liquids are aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like), silicone oils and blends of these solvents. Preferred carrier liquids include paraffinic solvent blends sold under the names Isopar® G liquid, Isopar® H liquid, Isopar® K liquid and Isopar® L liquid (manufactured by Exxon Chemical Corporation, Houston, Tex.). The preferred carrier liquid is Norpar® 12 liquid, also available from Exxon Corporation.

The ink particles are comprised of colorant embedded in a thermoplastic resin. The colorant may be a dye or more preferably a pigment. The resin may be comprised of one or more polymers or copolymers that are characterized as being generally insoluble or only slightly soluble in the carrier liquid; these polymers or copolymers comprise a resin core. In addition, superior stability of the dispersed ink particles with respect to aggregation is obtained when at least one of the polymers or copolymers (denoted as the stabilizer) is an amphipathic substance containing at least one chain-like component of molecular weight at least 500 which is solvated by the carrier liquid. Under such conditions, the stabilizer extends from the resin core into the carrier liquid, acting as a steric stabilizer as discussed in Dispersion Polymerization (Ed. Barrett, Interscience., p. 9 (1975). Preferably, the stabilizer is chemically incorporated into the resin core, i.e., covalently bonded or grafted to the core, but may alternatively be physically or chemically adsorbed to the core such that it remains as an integral part of the resin core.

The composition of the resin is preferentially manipulated such that the organosol exhibits an effective glass transition temperature (Tg) of less than 25° C. (more preferably less than 6° C.), thus causing an ink composition of liquid inks 52, 60, 68 and 76 containing the resin as a major component to undergo rapid film formation (rapid self fixing) in printing or imaging processes carried out at temperatures greater than the core Tg (preferably at or above 25° C.). The use of low Tg resins to promote rapid self fixing of printed or toned images is known in the art, as exemplified by Film Formation (Z. W. Wicks, Federation of Societies for Coatings Technologies, p. 8 (1986). Rapid self-fixing is thought to avoid printing defects (such as smearing or trailing-edge tailing) and incomplete transfer in high speed printing. For printing on plain paper, it is preferred that the core Tg be greater than minus 10° C. and, more preferably, be in the range from −5° C. to +5° C. so that the final image is not tacky and has good block resistance.

Such rapid self fixing is required of liquid inks 52, 60 and 68 to enable such liquid inks 52, 60 and 68 to film form before being subjected to overlay by a subsequent liquid ink 60, 68 and 76 in the formation of a subsequent color plane of the image. It is preferred that liquid inks 52, 60, 68 and 76 self fix within 0.5 seconds to enable the apparatus to operate at sufficient speed and to ensure image quality. It is generally believed that such rapid self-fixing will occur in liquid inks 52, 60, 68 and 76 which have greater than 75 percent volume fraction of solids in the image.

It is also preferred that the glass transition temperature (Tg) of liquid inks 52, 60, 68 and 76 be greater than −10° C. and less than +25° C. so that the final image is not tacky and has good block resistance. More preferred is a Tg between −5° C. and +5° C.

It is also preferred that liquid inks 52, 60, 68 and 76 have a low charge to mass ratio which assists in giving the resultant image high density. It is preferred that liquid inks 52, 60, 68 and 76 have a charge to mass ratio of from 0.025 to 0.1 microcoulombs/($cm^2$-OD). Liquid inks 52, 60, 68 and 76 have a charge to mass ratio of from 0.05 to 0.075 microcoulombs/($cm^2$-OD) in the most preferred embodiment. (This is the charge per developed optical density, which is directly proportional to charge per mass.)

It is also preferred that liquid inks 52, 60, 68 and 76 have a low free phase conductivity which aids in providing high resolution, gives good sharpness and low background. It is preferred that liquid inks 52, 60, 68 and 76 have a free phase conductivity of less than 30 percent at 1 percent solids. It is still more preferred that liquid inks 52, 60, 68 and 76 have a free phase conductivity of less than 20 percent at 1 percent solids. A free phase conductivity of less than 10 percent at 1 percent solids is most preferred for liquid inks 52, 60, 68 and 76.

Examples of resin materials suitable for use in liquid inks 52, 60, 68 and 76 include polymers and copolymers of (meth)acrylic esters; including methyl acrylate, ethyl acrylate, butyl acrylate, ethylhexyl acrylate, 2-ethylhexylmethacrylate, lauryl acrylate, octadecyl acrylate, methyl methacrylate, ethyl methacrylate, lauryl methacrylate, 2-hydroxy ethyl methacrylate, octadecyl methacrylate, 3,3,5-trimethylcyclohexyl methacrylate, dimethylaminoethyl methacryalte, diethylaminoethyl methacryalte, isobornyl (meth)acrylate, and other polyacrylates. Other polymers may be used in conjunction with the aforementioned materials, including melamine and melamine formaldehyde resins, phenol formaldehyde resins, epoxy resins, polyester resins, styrene and styrene/acrylic copolymers, acrylic and methacrylic esters, cellulose acetate and cellulose acetate-butyrate copolymers, and poly(vinyl butyral) copolymers.

The colorants which may be used in liquid inks 52, 60, 68 and 76 include virtually any dyes, stains or pigments which may be incorporated into the polymer resin, which are compatible with the carrier liquid, and which are useful and effective in making visible the latent electrostatic image. Examples of suitable colorants include: Phthalocyanine blue (C.I. Pigment Blue 15 and 16), Quinacridone magenta (C.I. Pigment Red 122, 192, 202 and 206), Rhodamine YS (C.I. Pigment Red 81), diarylide (benzidine) yellow (C.I. Pigment Yellow 12, 13, 14, 17, 55, 83 and 155) and arylamide (Hansa) yellow (C.I. Pigment Yellow 1, 3, 10, 73, 74, 97, 105 and 111); organic dyes, and black materials such as finely divided carbon and the like.

The optimal weight ratio of resin to colorant in the ink particles is on the order of 1/1 to 20/1, most preferably between 10/1 and 3/1. The total dispersed "solid" material in the carrier liquid typically represents 0.5 to 20 weight percent, most preferably between 0.5 and 3 weight percent of the total liquid developer composition.

Liquid inks 52, 60, 68 and 76 include a soluble charge control agent, sometimes referred to as a charge director, to provide uniform charge polarity of the ink particles. The charge director may be incorporated into the ink particles, may be chemically reacted to the ink particle, may be chemically or physically adsorbed onto the ink particle (resin or pigment), and may be chelated to a functional group incorporated into the ink particle, preferably via a functional group comprising the stabilizer. The charge director acts to impart an electrical charge of selected polarity (either positive or negative) to the ink particles. Any number of charge directors described in the art may be used herein; preferred positive charge directors are the metallic soaps. The preferred charge directors are polyvalent metal soaps of zirconium and aluminum, preferably zirconium octoate.

Charging device 18 is preferably a scorotron type corona charging device. Charging device 18 has high voltage wires (not shown) coupled to a suitable positive high voltage source of plus 4,000 to plus 8,000 volts. The grid wires of charging device 18 are disposed from about 1 to about 3 millimeters from the surface of organophotoreceptor 10 and are coupled to an adjustable positive voltage supply (not shown) to obtain an apparent surface voltage on organophotoreceptor 10 in the range plus 600 volts to plus 1000 volts or more depending upon the capacitance of organophotoreceptor. While this is the preferred voltage range, other voltages may be used. For example, thicker organophotoreceptors typically require higher voltages. The voltage required depends principally on the capacitance of organophotoreceptor 10 and the charge to mass ratio of the liquid ink utilized as the ink for apparatus 42. Of course, connection to a positive voltage is required for a positive charging organophotoreceptor 10. Alternatively, a negatively charging organophotoreceptor 10 using negative voltages would also be operable. The principles are the same for a negative charging organophotoreceptor 10.

Laser scanning device 50 imparts image information associated with a first color plane of the image, laser scanning device 58 imparts image information associated with a second color plane of the image, laser scanning device 66 imparts image information associated with a third color plane of the image and laser scanning device 74 imparts image information associated with a fourth color plane of the image. Although each of laser scanning devices 50, 58, 66 and 74 are associated with a separate color of the image and operate in the sequence as described above with reference to FIG. 3, for convenience they are described together below.

Laser scanning devices 50, 58, 66 and 74 include a suitable some of high intensity electromagnetic radiation. The radiation may be a single beam or an array of beams. The individual beams in such an array may be individually modulated. The radiation impinges, for example, on organophotoreceptor 10 as a line scan generally perpendicular to the direction of movement of organophotoreceptor 10 and at a fixed position relative to charging device 18.

The radiation scans and exposes organophotoreceptor 10 preferably while maintaining exact synchronism with the movement of organophotoreceptor 10. The image-wise exposure causes the surface charge of organophotoreceptor 10 to be reduced significantly wherever the radiation impinges. Areas of the surface of organophotoreceptor 10 where the radiation does not impinge are not appreciably discharged. Therefore, when organophotoreceptor 10 exits from under the radiation, its surface charge distribution is proportional to the desired image information.

The wavelength of the radiation to be transmitted by laser scanning devices 50, 58 and 66 is selected to have low absorption through the first three color planes of the image. The fourth image plane is typically black. Black is highly absorptive to radiation of all wavelengths which would be useful in the discharge of organophotoreceptor 10. Additionally, the wavelength of the radiation of laser scanning devices 50, 58, 66 and 74 selected should preferably correspond to the maximum sensitivity wavelength of organophotoreceptor 10. Preferred sources for laser scanning devices 50, 58, 66 and 74 are infrared diode lasers and light emitting diodes with emission wavelengths over 700 nanometers. Specially selected wavelengths in the visible may also be usable with some combinations of colorants. The preferred wavelength is 780 nanometers.

The radiation (a single beam or array of beams) from laser scanning devices 50, 58, 66 and 74 is modulated conventionally in response to image signals for any single color plane information from a suitable source such as a computer memory, communication channel, or the like. The mechanism through which the radiation from laser scanning devices is manipulated to reach organophotoreceptor 10 is also conventional.

The radiation strikes a suitable scanning element such as a rotating polygonal mirror (not shown) and then passes through a suitable scan lens (not shown) to focus the radiation at a specific raster line position with respect to organophotoreceptor 10. It will of course be appreciated that other scanning means such as an oscillating mirror, modulated fiber optic array, waveguide array, or suitable image delivery system may be used in place of or in addition to a polygonal mirror. For digital halftone imaging, it is preferred that radiation should be able to be focused to diameters of less than 42 microns at the one-half maximum intensity level assuming a resolution of 600 dots per inch. A lower resolution may be acceptable for some applications. It is preferred that the scan lens should be able to maintain this beam diameter across at least a 12 inches (30.5 centimeters) width.

The polygonal mirror typically is rotated conventionally at constant speed by controlling electronics, which may include a hysteresis motor and oscillator system or a servo feedback system to monitor and control the scan rate. Organophotoreceptor 10 is moved orthogonal to the scan direction at constant velocity by a motor and position/velocity sensing devices past a raster line where radiation impinges upon organophotoreceptor 10. The ratio between the scan rate produced by the polygonal mirror and organophotoreceptor 10 movement speed is maintained constant and selected to obtain the required addressability of laser modulated information and overlap of raster lines for the correct aspect ratio of the final image. For high quality imaging, it is preferred that the polygonal mirror rotation and organophotoreceptor 10 speed are set so that at least 600 scans per inch, and still more preferably 1200 scans per inch, are imaged on organophotoreceptor 10. It is preferable not to have organophotoreceptor 10 travel substantially faster than about 3 inches/second (7.6 centimeters/second).

Developer station 54 develops the first color plane of the image, developer station 62 develops the second color plane of the image, developer station 70 develops the third color plane of the image and developer station 78 develops the fourth color plane of the image. Although each of developer stations 54, 62, 70 and 78 are associated with a separate color of the image and operate in the sequence as described above with reference to FIG. 3, for convenience they are described together below.

Conventional liquid ink immersion development techniques are used in developer stations 54, 62, 70 and 78. Two modes of development are known in the art, namely deposition of liquid ink 52, 60, 68 and 76 in exposed areas of organophotoreceptor 10 and, alternatively, deposition of liquid ink 52, 60, 68 and 76 in unexposed regions. The former mode of imaging can improve formation of halftone dots while maintaining uniform density and low background densities. Although the invention has been described using a discharge development system whereby the positively charged liquid ink 52, 60, 68 and 76 is deposited on the surface of organophotoreceptor 10 in areas discharged by the radiation, it is to be recognized and understood that an imaging system in which the opposite is true is also contemplated by this invention. Development is accomplished by using a uniform electric field produced by developer roll 56, 64, 72 and 80 spaced near the surface of organophotoreceptor 10.

Developer stations 54, 62, 70 and 78 consist of developer roll 56, 64, 72 and 80, squeegee roller 82, 84, 86 and 88, fluid delivery system, and a fluid return system. A thin, uniform layer of liquid ink 52, 60, 68 and 76 is established on a rotating, cylindrical developer roll 56, 64, 72 and 80. A bias voltage is applied to the developer roll intermediate to the unexposed surface potential of organophotoreceptor 10 and the exposed surface potential level of organophotoreceptor 10. The voltage is adjusted to obtain the required maximum density level and tone reproduction scale for halftone dots without any background being deposited. Developer roll 56, 64, 72 and 80 is brought into proximity with the surface of organophotoreceptor 10 immediately before the latent image formed on the surface of organophotoreceptor 10 passes beneath the developer roll 56, 64, 72 and 80. The bias voltage on developer rolls 56, 64, 72 and 80 forces the charged pigment particles, which are mobile in the electric field, to develop the latent image. The charged “solid” particles in liquid ink 52, 60, 68 and 76 will migrate to and plate upon the surface of organophotoreceptor 10 in areas where the surface charge of organophotoreceptor 10 is less than the bias voltage of developer roll 56, 64, 72 and 80. The charge neutrality of liquid ink 52, 60, 68 and 76 is maintained by oppositely-charged, substantially transparent counter ions which balance the charge of the positively charged ink particles. Counter ions are deposited on the surface organophotoreceptor 10 in areas where the surface voltage of organophotoreceptor 10 is greater than the developer roll bias voltage.

After plating is accomplished by developer roll 56, 64, 72 and 80, squeegee roller 82, 84, 86 and 88 then rolls over the developed image area on organophotoreceptor 10 removing the excess liquid ink 52, 60, 68 and 76 and successively leaving behind each developed color plane of the image. A bias voltage can be applied to the squeegee roller 82, 84, 86 and 88 to prevent plating on them, especially when the resistivity of the squeegee roller is lower than $1\times10^{10}$ ohm/square, preferably lower than $1\times10^{9}$ ohm/square. Alternatively, sufficient excess liquid ink remaining on the surface of organophotoreceptor 10 could be removed in order to effect film formation by vacuum techniques well known in the art. The ink deposited onto organophotoreceptor 10 should be rendered relatively firm (film-formed) by the developer roll 56, 64, 72 and 80, squeegee roller 82, 84, 86 and 88 or an alternative drying technique in order to prevent it from being washed off in a subsequent developing process(es) by developer stations 62, 70 and 78. Preferably, the ink deposited on organophotoreceptor should be dried enough to have greater than seventy-five percent by volume fraction of solids in the image.

The organophotoreceptor includes an electrically conductive substrate and a photoconductive element in the form of a single layer that includes both a charge transport compound and a charge generating compound in a polymeric binder. Preferably, however, the organophotoreceptor includes an electrically conductive substrate and a photoconductive element that is a bilayer construction featuring a charge generating layer and a separate charge transport layer. The charge generating layer may be located intermediate the electrically conductive substrate and the charge transport layer. Alternatively, the photoconductive element may be an inverted construction in which the charge transport layer is intermediate the electrically conductive substrate and the charge generating layer.

The electrically conductive substrate may be flexible, for example in the form of a flexible web or a belt, or inflexible, for example in the form of a drum. Typically, a flexible electrically conductive substrate comprises of an insulated substrate and a thin layer of an electrically conductive material. The insulated substrate may be paper or a film forming polymer such as a polyester such as polyethylene terephthalate and polyethylene naphthalate, polyimide, polysulfone, polyamide, polycarbonate, vinyl resins such as polyvinyl fluoride and polystyrene, and the like. Specific examples of supporting substrates included polyethersulfone (Stabar® S-100, commercially available from ICI), polyvinyl fluoride (Tedlar®, commercially available from E.I. DuPont de Nemours & Company), polybisphenol-A polycarbonate (Makrofol®, commercially available from Mobay Chemical Company) and amorphous polyethylene terephthalate (Melinar®, commercially available from ICI Americas, Inc. and Dupont A and Dupont 442, commercially available from E.I. DuPont de Nemours & Company).

The electrically conductive material may be graphite, carbon black, iodide, conductive polymers such as polypyroles and Calgon® Conductive polymer 261 (commercially available from Calgon Corporation, Inc., Pittsburgh, Pa.), metals such as aluminum, titanium, chromium, brass, gold, copper, palladium, nickel, or stainless steel, or metal oxide such as tin oxide or indium oxide. Preferably, the electrically conductive material is aluminum or indium tin oxide. Typically, the insulated substrate will have a thickness adequate to provide the required mechanical stability. For example, flexible web substrates generally have a thickness from about 0.01 to about 1 mm, while drum substrates generally have a thickness of from about 0.5 mm to about 2 mm.

The charge generating compound is a material which is capable of absorbing light to generate charge carriers, such as a dyestuff or pigment. Examples of suitable charge generating compounds include metal-free phthalocyanines, metal phthalocyanines such as titanium phthalocyanine, copper phthalocyanine, oxytitanium phthalocyanine, hydroxygallium phthalocyanine, squarylium dyes and pigments, hydroxy-substituted squarylium pigments, perylimides, polynuclear quinones available from Allied Chemical Corporation under the tradename Indofast® Double Scarlet, Indofast® Violet Lake B, Indofast® Brilliant Scarlet and Indofast® Orange, quinacridones available from DuPont under the tradename Monastral® Red, Monastral® Violet and Monastral® Red Y, naphthalene 1,4,5,8-tetracarboxylic acid derived pigments including the perinones, tetrabenzoporphyrins and tetranaphthaloporphyrins, indigo- and thioindigo dyes, benzothioxanthene-derivatives, perylene 3,4,9,10-tetracarboxylic acid derived pigments, polyazo-pigments including bisazo-, trisazo- and tetrakisazo-pigments, polymethine dyes, dyes containing quinazoline groups, tertiary amines, amorphous selenium, selenium alloys such as selenium-tellurium selenium-tellurium-arsenic and selenium-arsenic, cadmium sulfoselenide, cadmiumselenide, cadmium sulfide, and mixtures thereof Preferably, the charge generating compound is oxytitanium phthalocyanine, hydroxygallium phthalocyanine or a combination thereof.

Preferably, the charge generation layer comprises a binder in an amount of from about 10 to about 90 weight percent and more preferably in an amount of from about 20 to about 75 weight percent, based on the weight of the charge generation layer.

There are many kinds of charge transport materials available for electrophotography. Suitable charge transport materials for use in the charge transport layer include, but are not limited to, pyrazoline derivatives, fluorine derivatives, oxadiazole derivatives, stilbene derivatives, hydrazone derivatives, carbazole hydrazone derivatives, triaryl amines, polyvinyl carbazole, polyvinyl pyrene, or polyacenaphthylene.

The charge transport layer typically comprises a charge transport material in an amount of from about 25 to about 60 weight percent, based on the weight of the charge transport layer, and more preferably in an amount of from about 35 to about 50 weight percent, based on the weight of the charge transport layer, with the remainder of the charge transport layer comprising the binder, and optionally any conventional additives. The charge transport layer will typically have a thickness of from about 10 to about 40 microns and may be formed in accordance with any conventional technique known in the art.

Conveniently, the charge transport layer may be formed by dispersing or dissolving the charge transport material and a polymeric binder in organic solvent, coating the dispersion and/or solution on the respective underlying layer and hardening (e.g., curing, polymerizing or drying) the coating. Likewise, the charge generation layer may be formed by dissolving or dispersing the charge generation compound and the polymeric binders in organic solvent, coating the solution or dispersion on the respective underlying layer and hardening (e.g., curing, polymerizing or drying) the coating.

The binder is capable of dispersing or dissolving the charge transport compound (in the case of the charge transport layer) and the charge generating compound (in the case of the charge generating layer). Examples of suitable binders for both the charge generating layer and charge transport layer include polystyrene-co-butadiene, modified acrylic polymers, polyvinyl acetate, styrene-alkyd resins, soya-alkyl resins, polyvinylchloride, polyvinylidene chloride, polyacrylonitrile, polycarbonates, polyacrylic acid, polyacrylates, polymethacrylates, styrene polymers, polyvinyl butyral, alkyd resins, polyamides, polyurethanes, polyesters, polysulfones, polyethers, polyketones, phenoxy resins, epoxy resins, silicone resins, polysiloxanes, poly(hydroxyether) resins, polyhydroxystyrene resins, novolak, poly(phenylglycidyl ether)-co-dicyclopentadiene, copolymers of monomers used in the above-mentioned polymers, and combinations thereof. Polycarbonate binders are particularly preferred for the charge transport layer, whereas polyvinyl butyral and polyester binders are particularly preferred for the charge generating layer. Examples of suitable polycarbonate binders for the charge transport layer include polycarbonate A which is derived from bisphenol-A, polycarbonate Z, which is derived from cyclohexylidene bisphenol polycarbonate C, which is derived from methylbisphenol A, and polyestercarbonates.

The photoreceptor may include additional layers as well. Such layers are well-known and include, for example, barrier layer, release layer, adhesive layer, ground stripe, and sub-layer. The release layer forms the uppermost layer of the photoconductor element with the barrier layer sandwiched between the release layer and the photoconductive element. The adhesive layer locates and improves the adhesion between the barrier layer and the release layer. The sub-layer is a charge blocking layer and is located between the electrically conductive substrate and the photoconductive element. The sub-layer may also improve the adhesion between the electrically conductive substrate and the photoconductive element.

Suitable barrier layers include coatings such as crosslinkable siloxanol-colloidal silica coating and hydroxylated silsesquioxane-colloidal silica coating, and organic binders such as polyvinyl alcohol, methyl vinyl ether/maleic anhydride copolymer, casein, polyvinyl pyrrolidone, polyacrylic acid, gelatin, starch, polyurethanes, polyimides, polyesters, polyamides, polyvinyl acetate, polyvinyl chloride, polyvinylidene chloride, polycarbonates, polyvinyl butyral, polyvinyl acetals such as acetoacetals and polyvinyl formal and polyvinyl butyral, polyacrylonitrile, polymethyl methacrylate, polyacrylates, polyvinyl carbazoles, copolymers of monomers used in the above-mentioned polymers, vinyl resins such as vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, cellulose polymers, and mixtures thereof. The above organic binders optionally may contain small inorganic particles such as fumed silica, silica, titania, alumina, zirconia, or a combination thereof The typical particle size is in the range of 0.001 to 0.5 micrometers, preferably 0.005 micrometers. A preferred barrier layer is a 1:1 mixture of methyl cellulose and methyl vinyl ether/maleic anhydride copolymer with glyoxal as a cross-linker.

The release layer topcoat may comprise any release layer composition known in the art. Preferably, the release layer is a fluorinated polymer, siloxane polymer, fluorosilicone polymer, silane, polyethylene, polypropylene, or a combination thereof. More preferably, the release layers comprises cross-linked silicone polymers.

Typical adhesive layers include film forming polymers such as polyester, polyvinylbutyral, polyvinylpyrolidone, polyurethane, polymethyl methacrylate, poly(hydroxy amino ether) and the like. Preferably, the adhesive layer comprises poly(hydroxy amino ether). If such layers are utilized, they preferably have a dry thickness between about 0.01 micrometer and about 5 micrometers.

Typical sub-layers include polyvinylbutyral, organosilanes, hydrolyzable silanes, epoxy resins, polyesters, polyamides, polyurethanes, silicones and the like. Preferably, the sub-layer has a dry thickness between about 20 Angstroms and about 2,000 Angstroms.

Typical electrically conductive ground stripe contains conductive particles, inorganic particle, a binder, and other additives. Preferably, the surface resistivity of the ground stripe is less than about $1\times10^4$ ohms per square.

Typical electrically conductive particles include carbon black, graphite, conducting polymers, vanadium oxide, copper, silver, gold, nickel, tantalum, chromium, zirconium, vanadium, niobium, indium tin oxide, and the like. Preferably, preferably, the electrically conductive particles should have a particle size less than 10 micrometers. Generally, the concentration of the electrically conductive particles in the ground stripe is less than about 40 percent by weight based on the total weight of the dried ground stripe in order to maintain sufficient strength and flexibility for flexible ground stripe.

Typical inorganic particles include silicon dioxide, aluminum oxide, titanium dioxide, alpha-$Fe_2O_3$, $Fe_3O_4$, MgO, $SnO_2$, $ZrO_2$, quartz, topaz, $MgAl_2O_4$, SiC, diamond, and $BeAl_2O_4$ and the like. Preferably, the inorganic particle is aluminum oxide, titanium dioxide, $ZrO_2$, $SiO_2$, or a combination thereof. An average inorganic particle size between about 0.3 micrometer and about 5 micrometers is preferred. Generally, the electrically conductive ground stripe comprises from about 5 percent by weight to about 40 percent, preferably from 20% to about 40%, by weight of inorganic particles, based on the total weight of the dried electrically conductive ground stripe layer.

Typical thermoplastic resins can be used as a binder for the ground stripe. They include polycarbonates, polyesters, polyacrylic acid and its copolymers, polyurethanes, acrylate polymers, methacrylate polymers, cellulose polymers, polyamides, nylon, polybutadiene, poly(vinyl chloride), polyisobutylene, polyethylene, polypropylene, polyterephthalate, polystyrene, styrene-acrylonitrile copolymer, and the like and mixtures thereof. Preferably, the binder is a polyester such as Vitel® 2200 (obtained commercially from Shell Chemical Co., Apple Grove, W.Va.)

Optional conventional additives, such as, for example, surfactants, fillers, coupling agents, fibers, lubricants, wetting agents, pigments, dyes, plasticizers, release agents, suspending agents, and curing agents, may be included in the ground stripe of the present invention.

The invention will now be described further by way of the following examples.

EXAMPLES

A. Organophotoreceptor

An inverted dual layer organophotoreceptor was prepared utilizing Compound 2 as described in U.S. Pat. No. 6,066,426. The organophotoreceptor included a polyester layer, an aluminum layer, a sub-layer (formed from Vitel® PE 2200, commercially obtained from Bostik Chemicals, Middleton, Mass., at a 4.4% solids in a 2:1 methyl ethyl ketone:toluene mixture, coated at a thickness of 0.2 micrometers using a slot die coater with a web speed of 3.048 m/min., dried in 4 oven zones of 110° C., 120° C., 140° C., and 150° C.), a charge transport layer, and a charge generating layer.

Two different barrier layer solutions were coated on the organophotoreceptor obtained above. The first ("Barrier A") was prepared by mixing 86.3 g of 3% Methocel® A15L V in water, 86.3 g of 3% Gantrez® AN-169 polymer (obtained commercially from ISP Technologies) in water, 172.44 g of methanol, 0.65 g of 40% Glyoxal® 40 in water, and 0.07 g Triton X-100 surfactant. The other barrier layer solution ("Barrier B") was prepared by combining 217.6 g of 6% S-Lec BX-5 polyvinyl butyral resin, 1385.7 g isopropyl alcohol, 33.5 g Nalco® 1057 colloidal silica, 33.1% Z-6040 silane (Dow Coming 50/50 in isopropyl alcohol/water), and 130.17 g Gantrez® AN-169 polymer. The barrier layer solution was die coated onto the dual layer organophotoreceptor and dried to form a layer having a nominal thickness of 0.4 micrometer.

A tie layer was coated on top of the barrier layer. The tie layer was formed from a tie layer coating composition including 3.1% poly(hydroxy amino ether) (trade designation XUR, commercially obtained from Dow Chemical, Midland, Mich.), 58.1% tetrahydrofuran, and 38.8% 1-methoxy-2-propanol. The tie layer was coated with a 4 mil (0.01016 cm) shim and a 5 micron filter at a web speed of 3.048 m/min. The coating was dried by 4 oven zones set at 90° C., 100° C., 110° C., and 110° C.

A release coating was coated on the top of the tie coat. The release coating solution contained 0.735% VDT-954 (commercially obtained from Gelest, Inc.), 2.626% SE-33 silicone resin (commercially obtained from GE Silicones), 1.176% DMS-V52 gum (commercially obtained from Gelest, Inc.), 0.5% Syloff® 7048 (commercially obtained from Dow Corning), 0.1575% Syloff® 4000 catalyst (commercially obtained from Dow Corning), 0.03675% diethyl fumarate (commercially obtained from Aldrich), 0.01575% benzyl alcohol (commercially obtained from Aldrich), 0.02625 Cab-O-Sil® 720 (commercially obtained from Cabot Corp), 15% methyl ethyl ketone and 79.727% heptane. The release coating composition was coated and subsequently cured at 150° C. for 1.5 minutes. The coating thickness of the release coating was 0.65 micrometer.

The inverted dual layer organophotoreceptor web obtained above was cut into 86 cm long and welded into a belt by an ultrasonic welder with a Branson 900B power supply, a Branson welding horn, a booster, and a converter (commercially obtained from Branson Ultrasonics Corp., Danbury, Conn.).

B. Seamless Drying Belt

A roll of Monolyn MQ™ 21 tubing (20.32 cm diameter with 76.2 microns sidewall thickness) was commercially obtained from M & Q Packaging Corporation (Schuykill Haven, Pa.). A piece of 35.3 cm length was cut from the roll. The creases of the seamless belt substrate were eliminated by heating the belt substrate mounted on a lab stand in an oven at 130° C. for 2–3 minutes and then by applying an 11 kg pressure with an aluminum strip (6.35 mm thick) on the creases before the belt cooled down to room temperature. The seamless belt substrate was then placed on the belt mount of a syringe coater. An absorbing material according to the formulation listed in Table 1 was applied at a flow rate of 20 cc/minute onto the seamless belt substrate while it was rotated at a speed of 60 RPM.

TABLE 1

| Ingredients | Weight % | Vendor | Vendor Location |
|---|---|---|---|
| SE-33 Gum | 20.20 | General Electric | Waterford, NY |
| VDT 954 Silicone | 0.28 | Gelest, Inc. | Tullytown, PA. |
| Diethyl fumarate-70% Benzyl Alcohol-30% | 0.84 | Aldrich, Inc. | Milwaukee, WI |
| Sylgard 186 cross-linker | 5.43 | Dow Corning Silcones | Auburn, MI |
| Syl-off Cross-linker 7678 | 0.84 | Dow Corning Silicones | Auburn, MI |
| Syl-off 4000 Catalyst | 0.41 | Dow Corning Silicones | Auburn, MI |
| n-heptane | 72 | Phillips Petroleum | Houston, TX |

After the application of the absorbing material onto the belt substrate, the absorbing material was allowed to air dry while rotating for 15 minutes. After the initial solvent was flashed off, the belt was removed from the mandrel by hand and cured for 10 minutes at 150° C. in an upright position over a round support in an oven.

C. Seamed Drying Belt

The seamed drying belt was prepared according to the procedure above for the seamless drying belt except a seamed belt substrate was used. The seamed belt substrate was prepared by cutting a Meliner™ (commercially obtained from ICI Americas, Inc., Arlington, Va.) web into a piece of 41.275 cm×35.1 cm. Then the two ends of the piece were overlapped by 508 microns and welded together to form a seamed belt substrate by an ultrasonic welder with a Branson 900B power supply, a Branson welding horn, a booster, and a converter (commercially obtained from Branson Ultrasonics Corp., Danbury, Conn.).

D. Test of the Drying Belt

1) Delamination

An important property of the absorbent layer of a drying belt is good adhesion to the belt substrate. A Taber abrader (commercially obtained from Taber Industries, Tonawandah, N.Y.) with a CS 5 felt wheel (commercially obtained from Taber Industries, Tonawandah, N.Y.) were used. A disk sample (11.43 cm diameter) was stamped out with a die and fitted into a specially manufactured dish that allowed the sample to be held down by means of a threaded nut on the top side of the sample. A 10-milliliter aliquot of Norpar™ 12 was charged onto the dish. The felt wheel was applied to the sample and a 500 g weight was used. The Abrader was set and allowed to run for 1000 revolutions. After 1000 revolutions, the sample was removed, patted dry with a paper towel and the wear pattern was examined. An abraded trail was visible as a wheel pattern in both the seamed and seamless drying belts.

2) Absorption

This test was used to determine the absorption of carrier fluids, e.g., Norpar™ 12, in liquid inks by the belt substrate. Ideally, the belt substrate should absorb as little carrier fluid as possible.

Three pieces of belt substrate were die cut into disks of 2.54 cm diameter. Each disk was weighed. The disks were immersed in a bath of Norpar™ 12 for a period of 16 hours. The samples were then weighed and the weight of Norpar™ 12 absorbed was calculated. The average amount of Norpar™ 12 absorbed by the three samples was found to be 0.9% by weight of the disk.

3) Printing Test

The drying belt was tested in a printing operation according to the following condition. The liquid inks (cyan ink, yellow ink, magenta ink, and black ink) used in the printing test were obtained according to the procedures as described in U.S. Pat. No. 6,066,426. The organophotoreceptor belt and the seamed drying belt were mounted on a homemade printing machine similar to the one described in FIG. 3. The organophotoreceptor belt was run at 81.28 mm/s (3.2 in/s). The voltage of the organophotoreceptor belt was held at 650 volts. The developer voltage was set at 500 volts before the seam entered the developer nip. The seamed drying belt was run at a speed of 81.28 mm/s. A line of ink was found either missing or redeposited on prints in the area contacted with the seam of the seamed drying belt.

The above printing test was repeated for the seamless drying belt. The seamless drying belt was run up to 2200 copies without any missing line of ink or redeposition.

While the present invention has been described with respect to its preferred embodiments, it is to be recognized and understood that changes, modifications and alterations in the form and in the details may be made without departing from the scope of the following claims.

What is claimed is:

1. A drying belt for electrophotographic imaging process comprising:

(a) a seamless substrate; and (b) an absorbent layer on the seamless substrate wherein the absorbent layer comprising an absorbing material for carrier liquid of an electrophotographic toner, wherein the absorbing layer provides both release properties and absorption properties and comprises polymeric materials selected from the group consisting of fluorinated polymers, fluorosilicon polymers and polysiloxane polymers.

2. A drying belt according to claim 1 wherein the absorbing material comprises a polysiloxane.

3. The drying belt of claim 2 wherein the absorbent layer is in contact with a photoconductor drum or photoconductor belt having a liquid toned image thereon between the absorbent layer and the photoconductor drum or photoconductor belt.

4. A drying belt according to claim 2 wherein the absorbent layer further comprises a cross-linking agent for the polymeric material of the absorbing layer.

5. The drying belt of claim 4 wherein the absorbent layer is in contact with a photoconductor drum or photoconductor belt having a liquid toned image thereon between the absorbent layer and the photoconductor drum or photoconductor belt.

6. The drying belt according to claim 1 wherein the seamless substrate comprises a polymeric belt.

7. The drying belt of claim 6 wherein the absorbent layer is in contact with a photoconductor drum or photoconductor belt having a liquid toned image thereon between the absorbent layer and the photoconductor drum or photoconductor belt.

8. A process for absorbing excess toner from a toned image comprising providing a charge on an electrophotographic imaging surface, differentially toning the imaging surface with a liquid electrophotographic toner comprising a carrier liquid, fixing the toned image, and contacting the toned image with the drying belt of claim 1 to remove excess carrier liquid.

9. The drying belt of claim 1 wherein the absorbent layer is in contact with a photoconductor drum or photoconductor belt having a liquid toned image thereon between the absorbent layer and the photoconductor drum or photoconductor belt.

10. A process of preparing a drying belt for electrophotographic imaging process comprising:

(a) mounting a seamless substrate on a belt mount;

(b) applying an absorbent layer comprising an absorbing material for carrier liquid of an electrophotographic toner on the seamless substrate; and (c) curing the absorbent layer by heat, wherein the absorbing layer provides both release properties and absorption properties and comprises polymeric materials selected from the group consisting of fluorinated polymers, fluorosilicon polymers and polysiloxane polymers.

11. A process of preparing a drying belt for electrophotographic imaging process according to claim 10 wherein the absorbing material comprises a polysiloxane.

12. A process of preparing a drying belt for electrophotographic imaging process according to claim 11 wherein the absorbent layer further comprises a cross-linking agent for the polysiloxane.

13. A process of preparing a drying belt for electrophotographic imaging process comprising:

(a) mounting a seamless substrate on a belt mount;

(b) applying an absorbent layer comprising an absorbing material for carrier liquid of an electrophotographic toner on the seamless substrate; and (c) curing the absorbent layer by heat wherein the absorbing layer comprises a silicone gum, a crosslinking agent for the silicone gum, and a solvent for the silicone gum and crosslinking agent.

14. A process for absorbing excess toner from a toned image comprising providing a charge on an electrophotographic imaging surface, differentially toning the imaging surface with a liquid electrophotographic toner comprising a carrier liquid, fixing the toned image, and contacting the toned image with a drying belt comprising;

(a) a seamless substrate; and (b) an absorbent layer on the seamless substrate wherein the absorbent layer comprising a polysiloxane absorbing material for carrier liquid of an electrophotographic toner.

15. The process of claim 14 wherein the polysiloxane absorbent layer further comprises a cross-linking agent for the polysiloxane.

* * * * *